United States Patent [19]

Schmitt

[11] 4,369,366

[45] Jan. 18, 1983

[54] PHOTOELECTRIC DIGITAL MEASURING INSTRUMENT BALANCING CIRCUIT

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 201,038

[22] Filed: Oct. 27, 1980

[30] Foreign Application Priority Data

Nov. 2, 1979 [DE] Fed. Rep. of Germany ....... 2944363

[51] Int. Cl.$^3$ .................... F21V 19/04; H05B 39/10
[52] U.S. Cl. ................................ 250/237 G; 362/20; 315/88
[58] Field of Search ............... 250/231 R, 237 G; 362/20; 315/88

[56] References Cited

U.S. PATENT DOCUMENTS

| | | | |
|---|---|---|---|
| 2,557,531 | 6/1951 | Blanchet | 362/20 X |
| 3,577,173 | 5/1971 | Blomgren | 362/20 X |
| 3,678,286 | 7/1972 | Willis | 315/88 X |
| 4,061,911 | 12/1977 | Krasin | 362/20 |
| 4,078,173 | 3/1978 | Fultz | 250/237 G |

FOREIGN PATENT DOCUMENTS 1915478 10/1969 Fed. Rep. of Germany .
1955878 5/1971 Fed. Rep. of Germany .
2144835 5/1973 Fed. Rep. of Germany .

Primary Examiner—David C. Nelms
Assistant Examiner—Edward P. Westin
Attorney, Agent, or Firm—Hume, Clement, Brinks, Willian & Olds, Ltd.

[57] ABSTRACT

A balancing circuit for a digital, photoelectric length or angle measuring system which includes a measuring scale, first and second light sources for illuminating the scale, and photosensitive scanning elements for measuring light modulated by the scale. The disclosed balancing circuit includes a separate balancing branch for each of the light sources. Each balancing branch is separately adjustable, and each balancing branch serves to provide an equal light signal use to compensate for the average intensity of the respective light source. Preferably, only one of the two light sources is activated at any given time, and the two balancing branches are arranged so that the balancing branch associated with the activated light source is not adversely influenced by the balancing branch associated with the non-activated light source. In this way, two or more separate, independently calibrated, balancing branches are provided to facilitate switching from one light source to another without requiring re-balancing of the measuring instrument.

5 Claims, 1 Drawing Figure

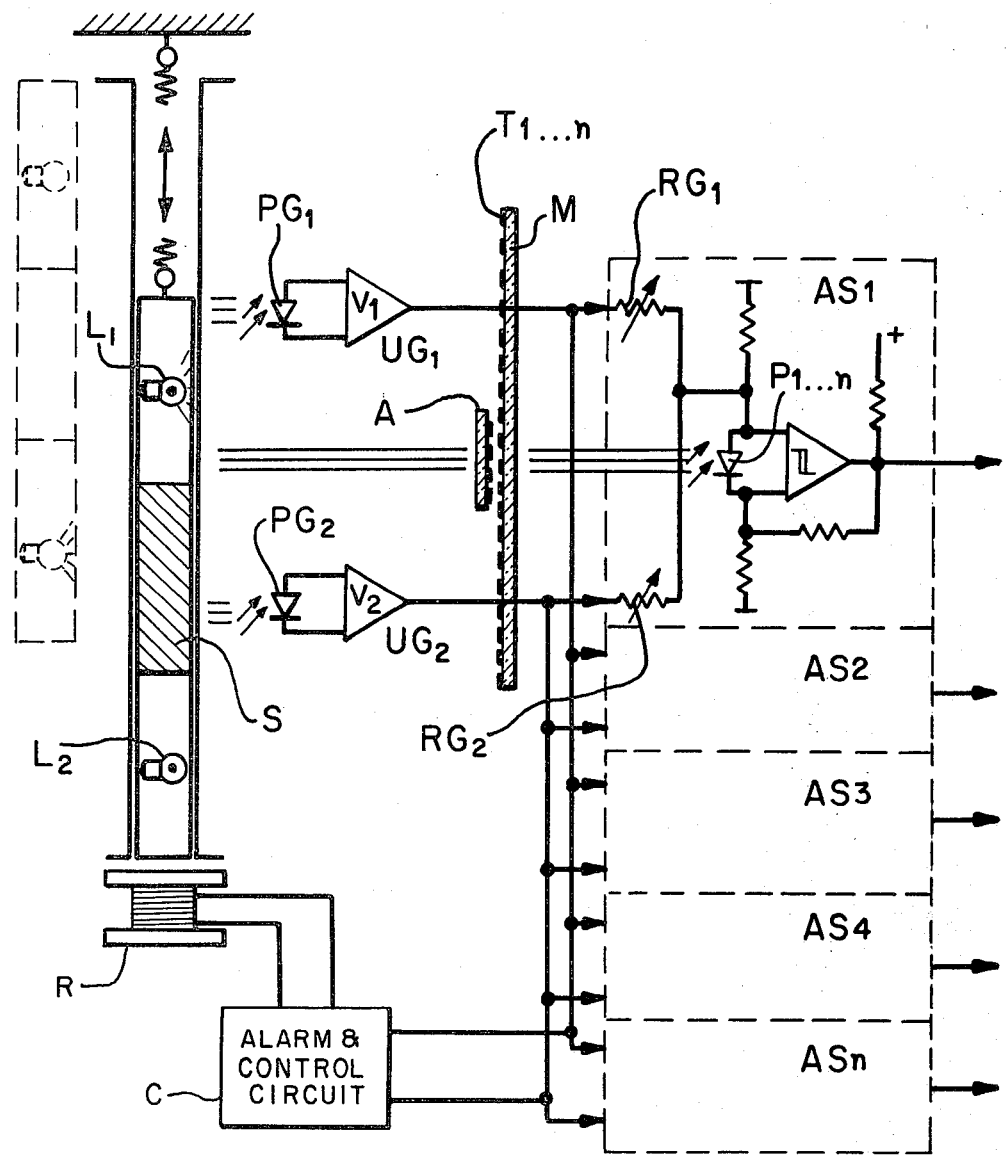

PHOTOELECTRIC DIGITAL MEASURING INSTRUMENT BALANCING CIRCUIT

BACKGROUND OF THE INVENTION

This invention relates to improvements in photoelectric, digital measuring instruments, and in particular to an improved balancing circuit for such instruments having two or more light sources.

A wide range of photoelectric length and angle measuring instruments are known to the prior art. See, for example, West German OS No. 1 955 878, West German OS No. 1 915 478, and West German Pat. No. 2 144 835. In such measuring instruments, the movement of a first object with respect to a second object is measured by measuring the modulation of a light beam which passes through grids having alternating translucent and opaque or reflecting and non-reflecting sections as the grids are moved with respect to one another.

In such prior art instruments, the measurement is interrupted when the light beam is disturbed, for example, when the light source fails to operate. In order to resume measurement, the light source (commonly an incandescent lamp or a light emitting diode) must be replaced and the photoelectric measuring instrument must be rebalanced for the new light source. Light sources are in general not identical in terms of brightness, and different light sources will generate differing photocurrents, which are adjusted with the aid of balancing circuits. During the down-time caused by this servicing, no measurements can be made. When, as is often the case, the measuring instrument is mounted to a machine tool, the operation of the machine tool is interrupted for the entire period during which the measuring instrument is being serviced.

SUMMARY OF THE INVENTION

The present invention is directed to an improved balancing circuit for photoelectric measuring instruments, which reduces the down-time of the measuring instrument occasioned by the failure of a light source. The general object of this invention is to provide a balancing circuit which eliminates the need to re-balance a measuring instrument immediately after a light source fails, thereby reducing unscheduled service procedures and resulting down-times when a light source fails.

According to this invention, a photoelectric length or angle measuring instrument, which includes means for optically scanning a measuring scale and at least first and second light sources, is provided with a balancing circuit which includes a balance branch for each light source. Only one of the at least two light sources is in operation at any one time, and the balance branch associated with the light source not in operation is adapted not to interfere with the balance branch associated with the light source which is in operation.

In this way, an improved balancing circuit is provided which allows both light sources to be balanced individually and properly when the light sources are originally installed. Then, when the first light source fails at a later time, the second light source can merely be activated and measurement can continue using the second light source and the previously adjusted second balance branch. Thus, the need to re-balance the measuring instrument immediately following the failure of a light source is eliminated, and the first light source can be replaced and the first balance branch readjusted at a convenient time, such as during regularly scheduled maintenance.

The invention itself, together with further objects and attendant advantages, will best be understood by reference to the following detailed description taken in connection with the accompanying drawing.

BRIEF DESCRIPTION OF THE DRAWING

The drawing is a schematic representation of the preferred embodiment of the circuit of this invention.

DETAILED DESCRIPTION OF THE PREFERRED EMBODIMENTS

Referring now to the drawing, a measuring instrument is provided with a measuring scale M having a plurality of division tracks $T_1 \ldots T_n$ and a scanning grid A which is movable relative to the measuring scale M. Two light sources $L_1, L_2$ are provided for the illumination of the scanned region of the scanning grid A and the measuring scale M. Relative movement of the scanning grid A with respect to the measuring scale M causes the light beam passing therethrough to be modulated. This modulated light beam impinges upon photosensitive scanning elements $P_1 \ldots P_n$, each of which is allocated to a respective one of the division tracks $T_1 \ldots T_n$ of the scale M. These photosensitive scanning elements $P_1 \ldots P_n$ generate currents that are evaluated in evaluating circuits $AS_1 \ldots AS_n$, respectively. The drawing shows only the circuitry for the first evaluating unit $AS_1$; however, the circuitry for the remaining evaluating circuits $AS_2 \ldots AS_n$ is comparable to the circuitry of $AS_1$.

In addition, the light sources $L_1, L_2$ illuminate photosensitive elements $PG_1$ and $PG_2$, respectively. These photosensitive elements $PG_1, PG_2$ deliver a DC voltage, $UG_1, UG_2$, which is indicative of the brightness of the respective light source $L_1, L_2$, respectively, to amplifiers $V_1, V_2$ and then to the evaluating circuits $AS_1 \ldots AS_n$. Adjustable resistors $RG_1, RG_2$ are provided in each of the evaluating circuits $AS_1 \ldots AS_n$ to attenuate the output signals of the amplifiers $V_1, V_2$, respectively, as necessary to generate bias signals of appropriate magnitudes. These bias signals are then applied to the respective scanning elements $P_1 \ldots P_n$ and their associated squaring amplifiers, as shown in the drawing.

The photosensitive elements $PG_1, PG_2$, the amplifiers $V_1, V_2$ and the adjustable resistors $RG_1, RG_2$ form two separate balance branches, respectively, one for each of the light sources $L_1, L_2$. Each of the two light sources $L_1, L_2$ delivers a separate light beam, so the adjustable resistors $RG_1, RG_2$ of the respective balance branches must be balanced exactly to the characteristics of the respective light source. This individual balancing takes place separately for each light source when the light sources $L_1, L_2$ are first installed and set in operation, and this balancing theoretically is preserved so long as the original light source is not replaced by a new one. Thus, since both balance branches are pre-balanced for the light sources $L_1, L_2$, respectively, it is not necessary to rebalance the measuring instrument when one of the light sources $L_1, L_2$ fails and the other is substituted.

It should be understood that the alarm and control circuit C operates to activate only one of the two light sources $L_1, L_2$ at any given time. Therefore, only one of the two photosensitive elements $PG_1, PG_2$ will be illuminated at any given time. The balance branch corresponding to the non-illuminated photosensitive element $PG_1, PG_2$ does not adversely affect the operation of the balance branch corresponding to the illuminated photosensitive element $PG_1, PG_2$ nor with the proper operation of the evaluating circuits $AS_1 \ldots AS_n$. Thus, at any given time only one of the two light sources, $L_1, L_2$ is in operation, yet an electronic balance branch which is pre-balanced for each of the light sources $L_1, L_2$ is provided.

Thus, for example, when the first light source $L_1$ fails, the second light source $L_2$ is switched on and moved to the illuminating position by the alarm and control circuit C such that the second light source $L_2$ illuminates both the scanned region of the scanning grid A and the photosensitive element $PG_2$ in the second balance branch. This second balance branch would have previously been calibrated for the second light source $L_2$, as described above.

The structure shown in the drawing is adapted to switch over from one light source to the other light source automatically when the first light source fails. For this purpose the light sources $L_1, L_2$ are arranged on a spring biased slider mechanism S. When one of the two light sources $L_1, L_2$ fails, the slider mechanism is moved electronically or electromagnetically into its other extreme position. In this way, the first light source $L_1$ is moved out of position, and the second light source $L_2$ is moved into position to illuminate the scanned region of the scanning grid A and the measuring scale M properly. In the illustrated embodiment, the circuit C controls a relay R to move the slider mechanism S. Other embodiments of the present invention can be constructed in which the light sources $L_1, L_2$ are fixedly mounted and light from a selected one of the light sources is conducted to the scanning grid A by movement of optical members, such as deflecting mirrors or prisms, for example. Alternately, a porter bar or a turntable can be substituted for the slider mechanism S.

It is also possible within the scope of the present invention to allocate to each light source $L_1, L_2$ a respective scanned region of its own on the scanning grid A, so that when a switchover is made between light source $L_1$ and light source $L_2$, separate, respective regions on the measuring scale M are scanned. The spatial displacement of the scanned regions causes a difference in the measured value which must be taken into account in the measurement. Thus, for example, in an angle measuring system, a displacement of the scanning places by exactly 180° could be compensated by inversion of the scanning signals.

A further variation is possible through the use of a photosensitive element in addition to the scanning elements $P_1 \ldots P_n$. The amplified output of this additional photosensitive element can be switched over to different balancing branches, each of which is allocated to a respective light source and includes a respective balancing element, such as an adjustable resistor, associated with that light source.

It is advantageous to use an alarm device such as the alarm and control circuit C which signals the user, by activating a lamp, for example, when one of the light sources has failed. The user then can install a new light source and recalibrate the respective balance branch during prescheduled machine inspection or servicing.

Of course, it should be understood that various changes and modifications to the preferred embodiments described above will be apparent to those skilled in the art. The foregoing description of the preferred embodiment is intended to be illustrative rather than limiting, and it is the claims, including all equivalents, rather than the foregoing description of the preferred embodiments, which are meant to define the scope and extent of the present invention.

I claim:

1. A balancing circuit for a digital, photoelectric length or angle measuring system, which measuring system includes a measuring scale, at least first and second light sources for illuminating the scale, and photosensitive scanning elements for measuring light modulated by the scale, said balancing circuit comprising:
    first balance means, responsive to the first light source, for generating a first bias signal which varies as a function of the intensity of the first light source;
    second balance means, responsive to the second light source, for generating a second bias signal which varies as a function of the intensity of the second light source;
    means for selectively activating a selected one of the first and second light sources; and
    means for utilizing the one of the first and second bias signals corresponding to the selected light source to balance at least one of the scanning elements with respect to the intensity of the selected light source, said utilizing means operative such that the balance means corresponding to the selected light source operates free of adverse interference from the balance means corresponding to the non-selected light source;
    said first and second balance means being independently adjustable such that the first and second bias signals can be adjusted independently of one another.

2. The invention of claim 1 wherein the activating means further includes means for automatically activating the second light source after the failure of the first light source.

3. The invention of claim 2 wherein the means for automatically activating the second light source includes a relay.

4. The invention of claim 1, further including means for generating an alarm signal indicative of the failure of the first light source.

5. A circuit for generating scanning signals in a photoelectric measuring device having a measuring scale, a scanning unit, and at least first and second light sources, said circuit comprising:
    means for selecting either of the first and second light sources such that light from the selected light source is directed at the scale;
    first balance means for generating a first bias signal which varies as a function of the intensity of the first light source;
    second balance means for generating a second bias signal which varies as a function of the intensity of the second light source;
    means, responsive to the first and second bias signals and included in the scanning unit, for generating a modulated measurement signal indicative of the intensity of light modulated by the scale, said first and second bias signals operative to balance the modulated measurement signal generating means with respect to the intensity of the selected light source; and
    means for deactivating the non-selected light source such that the one of the first and second balance means corresponding to the selected light source is unaffected by the other of the first and second balance means corresponding to the non-selected light source;

said first and second balance means being independently adjustable such that the first and second bias signals can be adjusted independently of one another.

* * * * *